UNITED STATES PATENT OFFICE.

ELI THAYER, OF WORCESTER, MASSACHUSETTS.

IMPROVED METHOD OF PREVENTING THE BREAKING OF GLASS BY EXPOSURE TO HEAT.

Specification forming part of Letters Patent No. 49,171, dated August 1, 1865.

*To all whom it may concern:*

Be it known that I, ELI THAYER, of Worcester, in the county of Worcester and State of Massachusetts, have invented a new and Improved Mode of Preventing the Breaking of Glass when Exposed to High Heat; and I do hereby declare that the following is a full and exact description thereof.

The nature of my invention consists in covering the side of the glass exposed to heat by a non-conducting substance which will adhere firmly to the glass, and by its very gradual heating and cooling will prevent the sudden expansion and contraction so destructive to glass when exposed to sudden changes of temperature.

To enable others skilled in the art to make and use my invention, I proceed to give a full description of its construction and mode of operation.

I apply to the surface of the glass to be exposed to the fire or to high and sudden heat a thin coating of hydrate of lime, either in a liquid or a plastic state, and then cover this coating, before it begins to harden, with a layer of dry beach-sand of the finest grain that can be procured. The work is now left until the lime has united with the glass on one side and with the sand in contact with it on the other, and has become dry and hard. The sand which has not become a part of the silicate is next brushed off and another wash of the hydrate of lime applied. When this has become dry and hard by a chemical union with the sand-surface to which it was applied the work is done and the glass is ready for use. I have made this lining in some cases entirely of hydrate of lime without the use of sand, but it is far inferior to the mixture above described. There are other non-conducting substances which can be used for this purpose, as fire-clay and plaster, but they would be much less durable, from their making no chemical union with the glass, and could not be so conveniently applied.

There are many articles now in use made of glass to which the application of this invention would be of great advantage—as, for example, many articles used in chemical laboratories; also, the shades and chimneys of lamps or of gas-burners. There are also many new uses to which glass may be applied when protected in the manner above described—as for the doors of stoves in place of isinglass, and for culinary purposes and for pipes. When applied to the chimneys of lamps either the whole or only a part of the inner surface may be covered by the non-conducting preparation or mixture, according to the use for which the lamp is designed. If it be only to light a room, the whole inner surface may be covered; but if a strong light is needed at a given point, as for reading, then a portion of the lower part of the chimney should be clear. In addition to the preservation of the glass in the case of its application to chimneys, there is another advantage of considerable importance in its use. This non-conducting lining attains a very high heat, and therefore consumes the smoke and gas escaping from the lamp much more perfectly than the ordinary chimney.

By means of this invention, therefore, a much larger flame may be had without smoke than in other cases. But it is not my purpose to specify all the uses to which this invention may be applied. Some are now apparent and others still may be found.

Having thus described my invention and its mode of application, what I claim as my invention, and desire to secure by Letters Patent, is—

The non-conducting lining when applied to the surface of glass exposed to fire or to a high heat, substantially as set forth.

ELI THAYER.

Witnesses:
JOHN D. BLOOR,
JOS. PECK.